United States Patent
Yu et al.

(10) Patent No.: US 8,911,156 B2
(45) Date of Patent: Dec. 16, 2014

(54) OPTICAL PLUG AND RELATED OPTICAL SIGNAL COUPLING ASSEMBLY

(71) Applicant: Hon Hai Precision Industry Co., Ltd., New Taipei (TW)

(72) Inventors: Tai-Cherng Yu, New Taipei (TW); I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 189 days.

(21) Appl. No.: 13/726,190

(22) Filed: Dec. 23, 2012

(65) Prior Publication Data

US 2013/0251311 A1      Sep. 26, 2013

(30) Foreign Application Priority Data

Mar. 22, 2012  (TW) .............................. 101109830 A

(51) Int. Cl.
*G02B 6/38* (2006.01)
*G02B 6/36* (2006.01)

(52) U.S. Cl.
CPC ................ *G02B 6/3807* (2013.01); *G02B 6/36* (2013.01)

USPC ........................................................... 385/74

(58) Field of Classification Search
USPC ........................................................... 385/74
See application file for complete search history.

(56) References Cited

U.S. PATENT DOCUMENTS

| 6,668,113 | B2 * | 12/2003 | Togami et al. ................... 385/33 |
| 7,630,593 | B2 * | 12/2009 | Furuno et al. ................... 385/14 |
| 2014/0003770 | A1 * | 1/2014 | Park et al. ....................... 385/70 |

* cited by examiner

*Primary Examiner* — Sung Pak
(74) *Attorney, Agent, or Firm* — Novak Druce Connolly Bove + Quigg LLP

(57) ABSTRACT

An optical plug includes a connector body. The connector body defines a receiving hole with a opening, a hollow pusher extends from the connector body and surrounding the receiving hole; and a number of lenses are arranged in the receiving hole. The connector body includes a first side surface and a second side surface, the first side surface defines a reflecting groove and the reflecting groove includes a reflecting surface, an included angle between the reflecting groove surface and the first side surface is 135 degrees. A number of lenses arrange on the second side surface to receive signal reflecting by the reflecting surface; and two elastic shielding plates have fixed ends fixed to opposite sides of the pusher, and opposite free ends overlappable to cover the opening.

17 Claims, 5 Drawing Sheets

OPTICAL PLUG AND RELATED OPTICAL SIGNAL COUPLING ASSEMBLY

BACKGROUND

1. Technical Field

The present disclosure relates to optical technology and, particularly, to an optical plug, and a related optical signal coupling assembly.

2. Description of Related Art

Optical signal coupling assemblies are preferred due to their high transmission speed and signal integrity, for use in data transmission between electronic devices. The optical signal coupling assembly includes two connectors, such as an optical plug and an optical receptacle, for allowing optical signal transmittance. When coupling the two connectors together, a lens in the plug is aligned with a corresponding lens in the receptacle to ensure the optical transmittance. However, the lenses are exposed to the air, and are easily contaminated. This decreases transmission efficiency and destroys the signal integrity.

Therefore, it is desirable to provide an optical plug, an optical receptacle, and a related optical signal coupling assembly, which can overcome or at least alleviate the limitations described.

DETAILED DESCRIPTION

Figure 1:
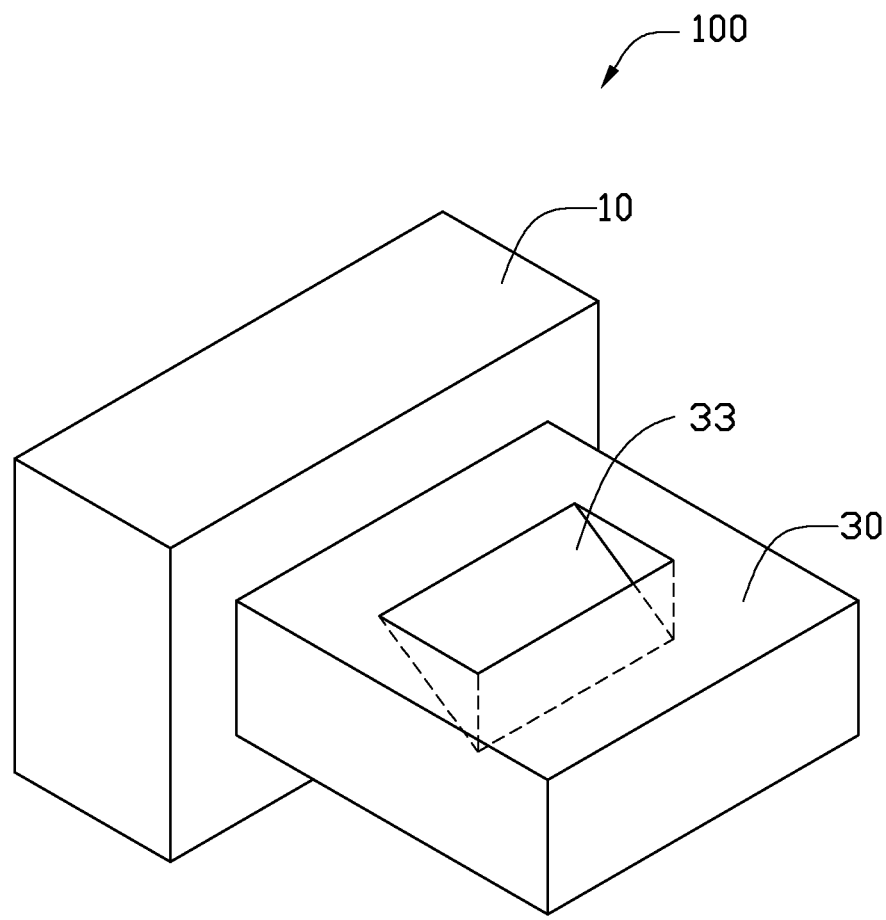
FIG. 1 is a schematic, isometric view of an optical signal coupling assembly, according to an exemplary embodiment, showing the optical signal coupling assembly in a coupled stated.

FIG. 1 shows an optical signal coupling assembly 100 according to an exemplary embodiment. The optical signal coupling assembly 100 includes an optical receptacle 10 and an optical plug 30. For example, the optical receptacle 10 may be assembled in electronic devices (not shown), such as printers, cameras, and computer hosts, for example. The optical plug 30 may be assembled in some portable electronic devices or computer peripherals and is coupled with the optical receptacle 10 for transmitting optical signals.

Figure 2:
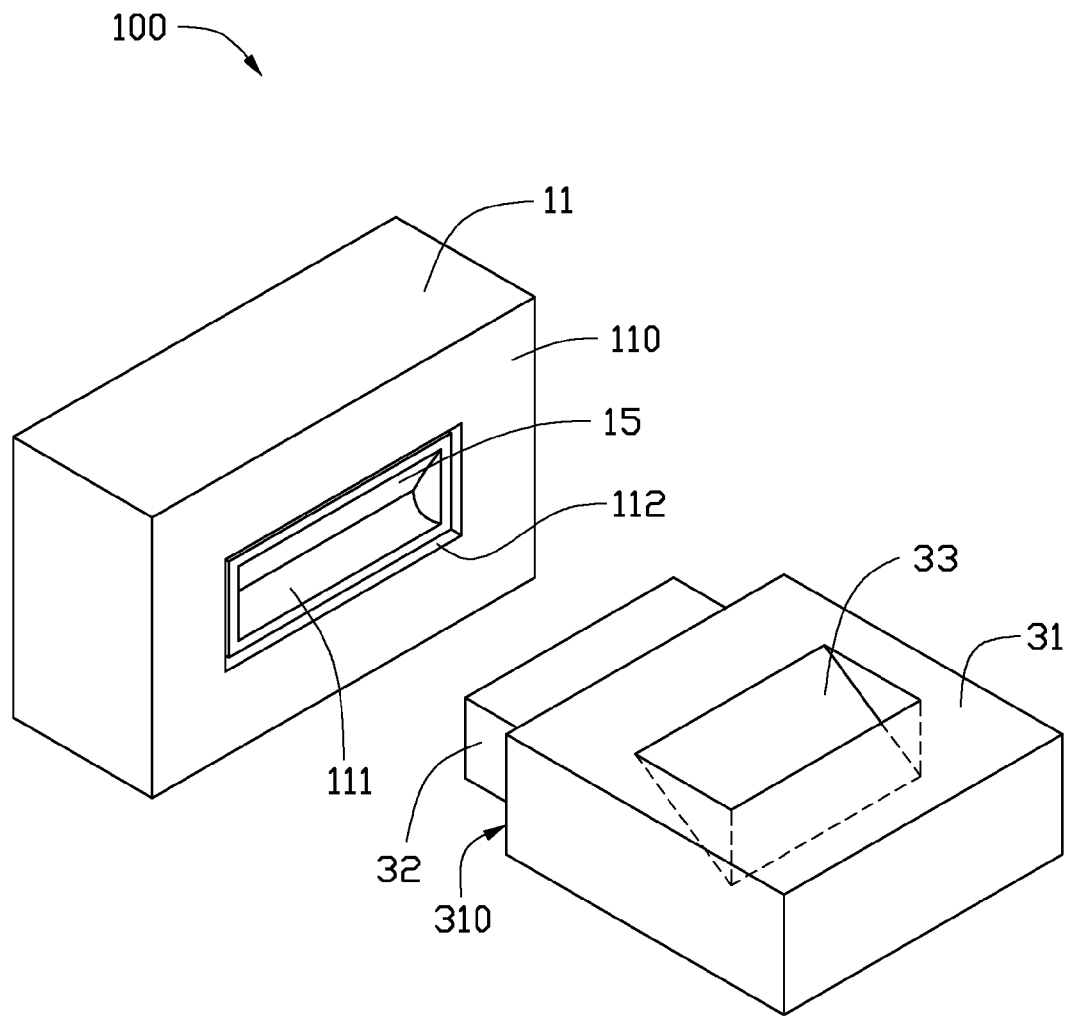
FIG. 2 is similar to FIG. 1, but showing the optical signal coupling assembly in an uncoupled stated.
Figure 3:
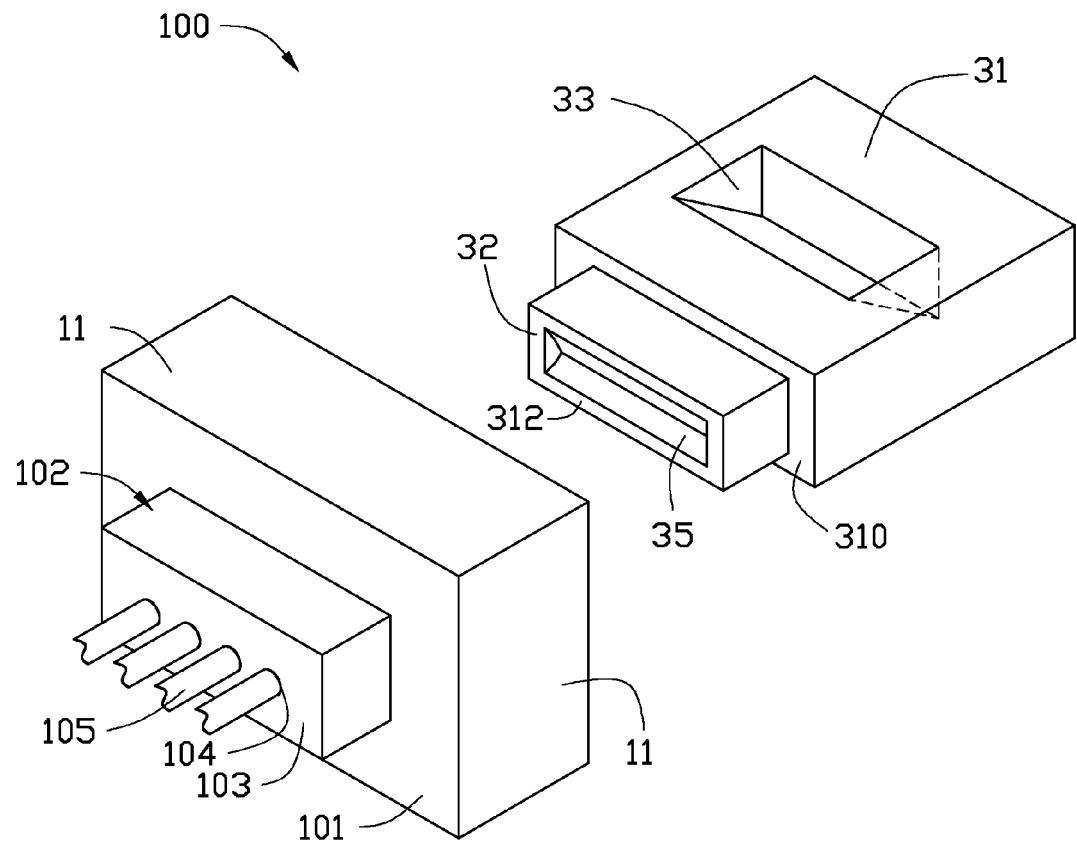
FIG. 3 is similar to FIG. 2, but viewed from another angle.
Figure 4:
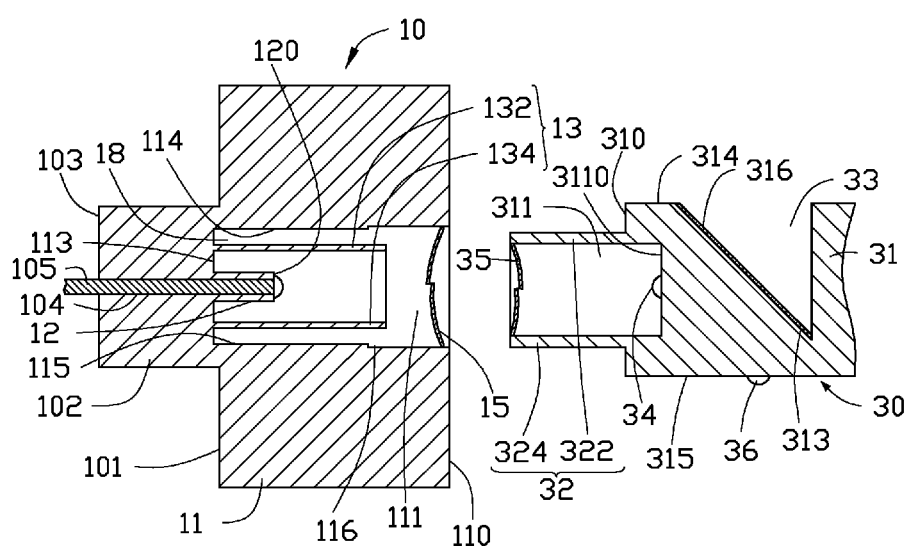
FIG. 4 is a cross sectional view of the optical signal coupling assembly of FIG. 2, showing the optical signal coupling assembly in an uncoupled stated.

FIGS. 2-4 show that the optical receptacle 10 includes a first connector body 11, a protrusion 102, a fiber support 12, a number of insertion holes 104, a plurality of optical fibers 105, a first hollow pusher 13, a number of first lenses 14, and two first shielding plates 15.

The first connector body 11 includes a first coupling surface 110 facing the optical plug 30 and a rear surface 101 opposite to the coupling surface 110. The first coupling surface 110 defines a first receiving hole 111 with a first opening 112. The first receiving hole 111 is substantially a cuboid. The protrusion 102 is formed on the rear surface 101. The protrusion 102 includes a back surface 103 parallel to the coupling surface 110, and the projection 102 configures for retaining the optical fibers 105.

The first connector body 11 includes a bottom surface 113, a first surface 114, and a second surface 115 in the first receiving hole 111. The first surface 114 is substantially parallel to the second surface 115. The first bottom surface 113 perpendicularly interconnects the first surface 114 and the second surface 115. Two recesses 116 are respectively defined in the first surface 114 and the second surface 115. The recesses 116 are positioned at a distal portion of the first receiving hole 111 away from the first bottom surface 113.

The fiber support 12 is a cuboid and extends from the first bottom surface 113 and configures for retaining distal portions of the optical fibers 105. The fiber support 12 includes a first light receiving surface 120 at a distal portion thereof. The light receiving surface 120 is substantially parallel to the first bottom surface 113. The first lenses 14 are received in the first receiving hole 111 and are partially arranged on the light receiving surface 120. The insertion hole 104 is opened from the back surface 103 and extends to the light receiving surface 120. The optical receptacle 10 further includes a plurality of optical fibers 105 inserted into the insertion hole 104 to be optically coupled to the first lenses 14.

The first hollow pusher 13 is a rectangular frame and is received in the first receiving hole 111. The first hollow pusher 13 extends from the first bottom surface 113. The first hollow pusher 13 includes a top wall 132 and a bottom wall 134. The top wall 132 is adjacent to the first surface 114. The bottom wall 134 is adjacent to the second surface 115. Two receiving rooms 118 are respectively formed between the first hollow pusher 13 and the first and second surfaces 114, 115.

The first shielding plates 15 are made of elastic material, such as plastic, rubber, and metal sheet. Each first shielding plate 15 includes a first fixed end (not labeled) and a first free end (not labeled) opposite to the first fixed end. The two first fixed ends are hinged to the first connector body 11 at opposite sides of the first receiving hole 111, and the two first free ends are free and overlappable to cover the first opening 112, thereby preventing contamination from contaminating the first lenses 14. In detail, the first fixed ends are respectively fixed to the first surface 114 and the second surface 115.

The optical plug 30 includes a second connector body 31, a second hollow pusher 32, a reflecting groove 33, a number of second lenses 34, a plurality of underside lenses 36, and two second shielding plates 35.

The second connector body 31 includes a second coupling surface 310 facing the first coupling surface 110. The second coupling surface 310 defines a second receiving hole 311 with a second opening 312. The second receiving hole 311 includes a second bottom surface 3110. The second lenses 34 are arranged on the second bottom surface 3110. Each second lens 34 corresponds to a first lens 14.

The second connector body 31 includes a first side surface 314 and a second side surface 315 at an opposite side of the second connector body 31. The first side surface 314 is substantially parallel to the second side surface 315. The first side surface 314 defines the reflecting groove 33. The reflecting groove 33 includes a reflecting groove surface 313 obliquely oriented relative to the first side surface 314. An included angle between the reflective surface 313 and the first side surface 314 is about 135 degrees. In this embodiment, the reflecting groove surface 313 is coated with a reflective film 316 to fill the slit on the reflecting groove surface 313 by injection molding and at last to ensure a total internal reflection of optical signals on the reflecting groove surface 313. The material of the reflecting film 316 may be gold, silver, copper or aluminum, and any combination thereof.

The underside lenses 36 are arranged on the second side surface 315 to receive light reflected from the reflecting groove surface 313. Optical signals are converged by the second lenses 34 and reach the reflecting groove surface 313 and the underside lenses 36 are used for receiving optical signal reflecting by the reflecting groove surface 313. In this way, a light path of the optical signal can be changed and the optical plug 30 can be made more compact. The optical plug 30 may be positioned on a circuit board to cover a photo diode(s) and/or a laser diode(s) on the circuit board with the second side surface 315 facing the circuit board. The photo diode(s) receive(s) the optical signal converged by the underside lenses 36. The underside lenses 36 converges optical signals from the laser diode(s) to the reflecting groove surface 313 and then the reflecting groove surface 313 reflects the optical signals to the second lenses 34.

The second connector body 31 is made from transparent polymer material, such as poly methyl methacrylate. The second connector body 31, the second lenses 34 and the underside lenses 36 are integrally molded in this embodiment.

The second hollow pusher 32 is a rectangular frame and extends from the second coupling surface 310. The second hollow pusher 32 includes an upper wall 322 and a lower wall 324 substantially parallel to the lower wall 324. The second hollow pusher 32 surrounds the second receiving hole 311.

The second shielding plates 35 are made of elastic material, such as plastic, rubber, and metal sheet. Each second shielding plate 35 includes a second fixed end (not label) and a second free end (not label) opposite to the second fixed end. The two second fixed ends are fixed to opposite sides of the second hollow pusher 32, and the two second free ends are free and overlappable to cover the second opening 312, thereby preventing contamination from contaminating the second lenses 34. In detail, the second fixed ends are respectively fixed to the upper wall 322 and the lower wall 324.

Figure 5:
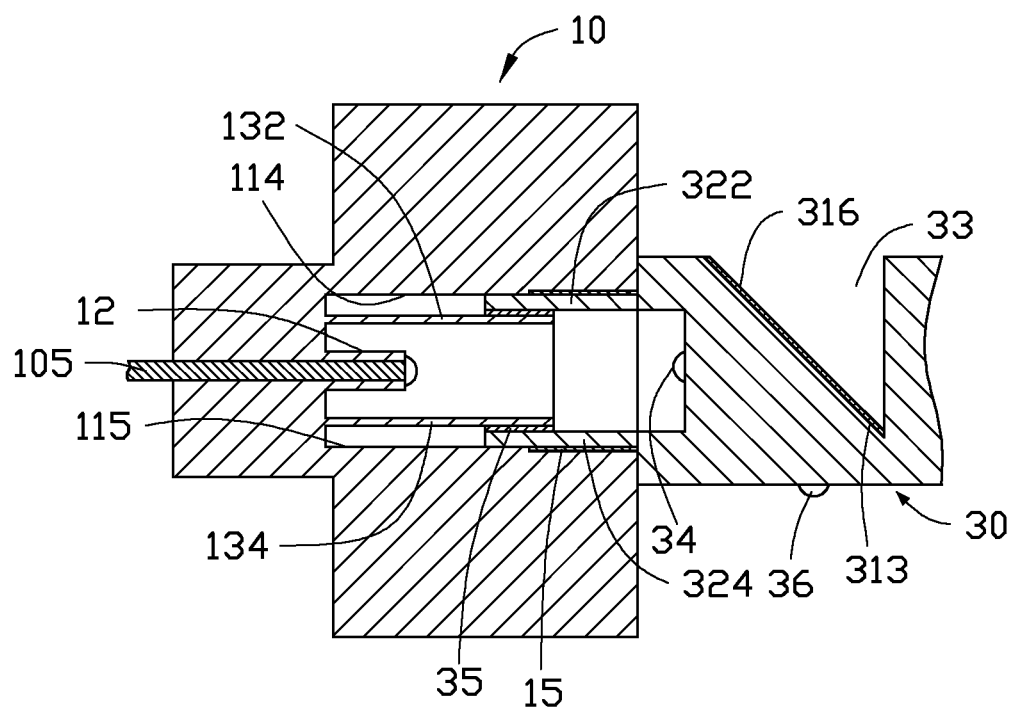
FIG. 5 is similar to FIG. 4, but showing the optical signal coupling assembly in a coupled stated.

FIGS. 4-5 show that when the optical plug 30 is inserted into the optical receptacle 10, the second hollow pusher 32 pulls the first shielding plates 15. The first shielding plates 15 are bent toward the first surface 114 and the second surface 115. When the optical plug 30 is further inserted into the optical receptacle 10, the first hollow pusher 13 pulls the second shielding plates 35. The second shielding plates 35 are bent toward the upper wall 322 and the lower wall 324. In this situation, the second hollow pusher 32 is received in the receiving room 118. The first coupling surface 110 abuts the second coupling surface 310. The second hollow pusher 32 presses the first shielding plates 15 in the recesses 116. The second shielding plates 35 are pressed between the first hollow pusher 13 and the second hollow pusher 32. In detail, one of the second shielding plates 35 is positioned between the top wall 132 and upper wall 322, and the other is positioned between the bottom wall 134 and the lower wall 324. Therefore, the first shielding plates 15 and the second shielding plates 35 are open. In other words, the light path between the first lenses 14 and the second lenses 34 is clear. As a result, the optical signals from the first lenses 14 are optically coupled with a corresponding second lenses 34, then reflected via the reflective surface 313, and then reach into the underside lenses 36. Therefore, optical transmittance can begin and is not influenced by the first shielding plates 15 and the second shielding plates 35.

In other embodiments, the first hollow pusher 13 and the second hollow pusher may be hollow cylindericals. When the optical plug 30 is coupled with the optical receptacle 10, the second shielding plates 35 are pressed between the circumference wall of the first hollow pusher 13 and the circumference wall of the second hollow pusher 32.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An optical signal coupling assembly comprising:
    an optical receptacle comprising:
        a first connector body defining a first receiving hole with a first opening, the first connector body comprising a bottom surface in the first receiving hole, the bottom surface facing the first opening;
        a first hollow pusher extending from the bottom surface and received in the first receiving hole;
        a plurality of optical fibers extending through the first connector body;
        a plurality of first lenses received in the first receiving hole and optically coupled to the optical fibers; and
        two first shielding plates having first fixed ends hinged to the first connector body at opposite sides of the first receiving hole, and opposite first free ends overlappable to cover the first opening; and
    an optical plug comprising:
        a second connector body defining a second receiving hole with a second opening,
        a second hollow pusher extending from the second connector body and surrounding the second receiving hole;
        a plurality of second lenses received in the second receiving hole;
        wherein the second connector body includes a first side surface and an opposite second side surface, a reflecting groove defined in the first side surface; the reflecting groove including a reflecting groove surface obliquely oriented relative to the first side surface, an included angle between the reflecting groove surface and the first side surface is about 135°;
        a plurality of underside lenses arranged on the second side surface, the reflecting groove surface configured to reflect and direct light from the second lenses to the respective underside lenses; and
        two second shielding plates having second fixed ends coupled to opposite sides of the second hollow pusher, and opposite second free ends overlappable to cover the second opening;
        wherein the optical plug is inserted in the optical receptacle, the first shielding plates are bent inwardly toward the bottom surface by the second hollow pusher, and the second shielding plates are bent inwardly by the first hollow pusher so as to expose the first lenses to the second lenses.

2. The optical signal coupling assembly in claim 1, wherein the optical receptacle further comprises a rear surface and a protrusion formed on the rear surface, the protrusion configured for retaining the optical fibers.

3. The optical signal coupling assembly in claim 1, wherein the optical receptacle further comprises a fiber fiber support, the fiber fiber support extending from the bottom surface of the first receiving hole and configured for retaining distal portions of the optical fibers, and the fiber support has a first light receiving surface facing toward the first opening, and the first lenses are formed on the first light receiving surface.

4. The optical signal coupling assembly in claim 3, wherein the optical receptacle further comprises a number of insertion hole defined in the fiber fiber support with the distal portions of the optical fibers inserted thereinto.

5. The optical signal coupling assembly in claim 1, wherein the reflecting groove surface is coated with a reflective film.

6. The optical signal coupling assembly in claim 5, wherein the material of the reflecting film is selected from the group consisting of gold, silver, copper, aluminum and any combination thereof.

7. The optical signal coupling assembly in claim 1, wherein the first connector body comprises a first surface and a second surface in the first receiving hole, the first surface is substantially parallel to the second surface, the bottom surface perpendicularly connects the first surface to the second surface, two recesses are respectively defined in the first surface and the second surface, and the first fixed ends of the first shielding plates are fixed to the first surface and the second surface respectively.

8. The optical signal coupling assembly in claim 1, wherein the first hollow pusher is a rectangular tubular housing and comprises a top wall and a bottom wall, the top wall is adjacent to the first surface, the bottom wall is substantially parallel to the top wall and is adjacent to the second surface, a receiving room is formed between the first hollow pusher and the first and second surfaces, and the second hollow pusher is received in the receiving room.

9. The optical signal coupling assembly in claim 1, wherein the first hollow pusher is cylindrical.

10. The optical signal coupling assembly in claim 1, wherein the second hollow pusher is a rectangular tubular housing and comprises an upper wall and a lower wall parallel to the upper wall, and the second fixed ends of the second shielding plates are to the upper wall and the lower wall respectively.

11. The optical signal coupling assembly in claim 1, wherein the second hollow pusher is cylindrical.

12. The optical signal coupling assembly in claim 1, wherein the second connector body further comprises a second bottom surface in the second receiving hole, and the second lenses are arranged on the second bottom surface.

13. An optical plug comprising:
a connector body defining a receiving hole with an opening,
a hollow pusher extending from the connector body and surrounding the receiving hole;
a plurality of front lenses received in the receiving hole;
the connector body including a first side surface and an opposite second side surface, a reflecting groove defined in the first side surface;
the reflecting groove including a reflecting groove surface obliquely oriented relative to the first side surface, an included angle between the reflecting groove surface and the first side surface is about 135°;
a plurality of underside lenses arranged on the second side surface, the reflecting groove surface configured to reflect and direct light from the front lenses to the respective underside lenses; and
two shielding plates having fixed ends coupled to opposite sides of the pusher, and opposite free ends overlappable to cover the opening.

14. The optical plug in claim 13, wherein the pusher is a rectangular tubular and comprises an upper wall and a lower wall parallel to the upper wall, and the fixed ends of the shielding plates are hinged to the upper wall and the lower wall, respectively.

15. The optical plug in claim 13, wherein the pusher is cylindrical.

16. The optical plug in claim 13, wherein the reflecting groove surface is coated with a reflective film.

17. The optical plug in claim 13, wherein the material of the reflecting film is selected from the group consisting of gold, silver, copper, aluminum and any combination thereof.

* * * * *